United States Patent
Kobayashi

(10) Patent No.: US 8,422,462 B2
(45) Date of Patent: Apr. 16, 2013

(54) MOBILE COMMUNICATION DEVICE AND MOBILE COMMUNICATION METHOD USING A PLURALITY OF DIFFERENT TYPES OF RADIO COMMUNICATION INTERFACES

(75) Inventor: Hirokazu Kobayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 355 days.

(21) Appl. No.: 12/865,978

(22) PCT Filed: Jan. 29, 2009

(86) PCT No.: PCT/JP2009/000348
§ 371 (c)(1),
(2), (4) Date: Aug. 3, 2010

(87) PCT Pub. No.: WO2009/098853
PCT Pub. Date: Aug. 13, 2009

(65) Prior Publication Data
US 2011/0007713 A1    Jan. 13, 2011

(30) Foreign Application Priority Data

Feb. 5, 2008 (JP) ................................ 2008-025623

(51) Int. Cl.
*H04W 72/00* (2009.01)
*H04W 36/20* (2009.01)
(52) U.S. Cl.
USPC .......... 370/332; 370/328; 370/329; 370/331; 455/403; 455/436; 455/442
(58) Field of Classification Search .................. 370/328, 370/329, 331, 332; 455/403, 436–442
See application file for complete search history.

(56) References Cited

U.S. PATENT DOCUMENTS
2008/0076434 A1* 3/2008 Shigaki et al. ................ 455/442
2009/0168720 A1* 7/2009 Vinayakray-Jani et al. .. 370/331

FOREIGN PATENT DOCUMENTS
JP    2003-274445    9/2003
JP    2004-153321    5/2004
(Continued)

OTHER PUBLICATIONS
International Search Report dated Mar. 3, 2009.
(Continued)

*Primary Examiner* — Andrew Lai
*Assistant Examiner* — Siming Liu
(74) *Attorney, Agent, or Firm* — Dickinson Wright PLLC

(57) ABSTRACT

Disclosed are a mobile communication device and mobile communication method which make it possible to reduce the amount of the data transfer during heterogeneous network handover processing in the hard handover processing in a mobile network. The mobile communication device which is equipped with a plurality of kinds of radio communication interfaces, receives a request to perform the handover between heterogeneous networks, which requests switching from a radio communication interface in use to another radio communication interface from the mobile communication network, and performs the handover between the heterogeneous networks comprises a measurement processing section (106) for measuring the connection quality of the plurality of kinds of radio communication interfaces, a handover execution predicting section (107); for predicting whether or not the handover between the heterogeneous networks is performed on the basis of the connection quality, and a TCP window control unit (113) for setting a window size to a smaller window size than the window size in use if the handover execution predicting section (107) predicts that the handover between the heterogeneous networks is performed.

10 Claims, 9 Drawing Sheets

FOREIGN PATENT DOCUMENTS

| | | |
|---|---|---|
| JP | 2006-180413 | 7/2006 |
| JP | 2008-005393 | 1/2008 |

OTHER PUBLICATIONS

Sung-Eun Kim, et al., "TCP for Seamless Vertical Handoff in Hybrid Mobile Data Networks," IEEE, Globecom 2003, pp. 661-665 and 2279-2280.

3GPP TS 23.401 V1.2.1, "3$^{rd}$ Generation Partnership Project; Technical Specification Group Services and System Aspects; GPRS enhancements for E-UTRAN access (Release 8)," Sep. 2007, pp. 1-87.

M Allman, et al., "TCP Congestion Control," RFC 2581, Apr. 1999, pp. 1-12.

Notice of Reason for Rejection dated Jul. 24, 2012.

* cited by examiner

|  | MEASUREMENT TIME | RECEIVED SIGNAL STRENGTH [dBm] |
|---|---|---|
| LTE INTERFACE | T1 | −11 |
| UMTS INTERFACE | T2 | 2 |

FIG.2

| LTE INTERFACE RECEIVED SIGNAL STRENGTH | −11 |
|---|---|
| UMTS INTERFACE RECEIVED SIGNAL STRENGTH | 2 |
| POSITION INFORMATION | P1 |
| MEASUREMENT TIME | T1 |
| INTERFACE AFTER SWITCH | UMTS |

| LTE INTERFACE RECEIVED SIGNAL STRENGTH | 5 |
|---|---|
| UMTS INTERFACE RECEIVED SIGNAL STRENGTH | −20 |
| POSITION INFORMATION | P3 |
| MEASUREMENT TIME | T3 |
| INTERFACE AFTER SWITCH | LTE |

| LTE INTERFACE RECEIVED SIGNAL STRENGTH | 1 |
|---|---|
| UMTS INTERFACE RECEIVED SIGNAL STRENGTH | 7 |
| POSITION INFORMATION | P2 |
| MEASUREMENT TIME | T2 |
| INTERFACE FOR USE | LTE |

| LTE INTERFACE RECEIVED SIGNAL STRENGTH | 3 |
|---|---|
| UMTS INTERFACE RECEIVED SIGNAL STRENGTH | −5 |
| POSITION INFORMATION | P4 |
| MEASUREMENT TIME | T4 |
| INTERFACE FOR USE | UMTS |

|  | INITIAL VALUE | SETTING VALUE IN PREDICTED HANDOVER EXECUTION PERIOD | SETTING VALUE BEFORE EXECUTING HANDOVER |
| --- | --- | --- | --- |
| LTE INTERFACE IN USE | 128KB | 16KB | 96KB |
| UMTS INTERFACE IN USE | 32KB | 16KB | 32KB |

FIG.5

|  | INITIAL VALUE | SETTING VALUE IN HANDOVER PREDICTION | SETTING VALUE BEFORE EXECUTING HANDOVER |
|---|---|---|---|
| LTE INTERFACE IN USE | 128KB | 16KB | 96KB |
| UMTS INTERFACE IN USE | 32KB | 16KB | 32KB |

FIG.6

|  | INITIAL VALUE | LATEST VALUE | SETTING VALUE |
|---|---|---|---|
| SWITCH FROM LTE TO UMTS | 2sec | 50ms | 1sec |
| SWITCH FROM UMTS TO LTE | 5sec | 70ms | 1sec |

FIG.7

MOBILE COMMUNICATION DEVICE AND MOBILE COMMUNICATION METHOD USING A PLURALITY OF DIFFERENT TYPES OF RADIO COMMUNICATION INTERFACES

TECHNICAL FIELD

The present invention relates to a mobile communication apparatus and mobile communication method using a plurality of different types of radio communication interfaces. More particularly, the present invention relates to a mobile communication apparatus and mobile communication method that controls the amount of communication flow upon switching between different types of radio communication interfaces during communication.

BACKGROUND ART

In 3GPP (3rd Generation Partnership Project) that standardizes mobile communication systems, 3GPP-LTE/SAE (Long Term Evolution/System Architecture Evolution) is being standardized as the next mobile communication system.

3GPP-LTE/SAE standards have proposed radio access technologies (hereinafter "RATs") each standardized in 3GPP in the past. 3GPP-LTE/SAE standards disclose the steps of inter-RAT handover, which is used by switching between the communication interface for the mobile communication system for the second generation (GS: Global System for Mobile Communication or GPRS: General Packet Radio Service) or the third generation (UMTS: Universal Mobile Telecommunication System) and the communication interface for 3GPP LTE.

Inter-RAT handover is so called "vertical handover" and refers to handover between different systems (or networks).

With inter-RAT handover in systems defined in 3GPP, whether to execute handover is decided on the mobile communication network side.

When the conditions for executing inter-RAT handover are fulfilled, a data transfer communication path from an access network that the communication interface which a mobile communication apparatus is currently connected with, utilizes to the access network that the communication interface utilizes after the switch, is secured in the access network. Then, a handover execution command message (a handover command) is transmitted to the mobile communication apparatus and makes the mobile communication apparatus execute inter-RAT handover processing.

Upon receiving the handover command, the mobile communication apparatus disconnects the connection with the communication interface currently in use, performs connection processing of the communication interface designated in the handover command, and switches the communication interface to utilize.

Communication data delivered to the access network before the switch during inter-RAT handover is transferred to the access network to be used by the communication interface after the switch through the data transfer communication path secured as described above, or is subject to bi-cast (e.g. Non-Patent Document 1).

Further, the TCP protocol is mainly used as a data communication method on the Internet or in mobile communication systems. With the TCP protocol, the actual amount of consecutive data transmission is determined from an advertised window and a congestion window (e.g. Non-Patent Document 2). The advertised window shows the amount of data which a TCP data segment receiving apparatus is then able to receive, to the access network. Also, the congestion window shows the amount of consecutive data which a TCP data transmitting apparatus estimates not to cause network congestion even if the TCP data transmitting apparatus continuously performs transmission, to the access network.

A mobile communication apparatus having a communication interface for a mobile communication network and a communication interface for a wireless LAN is a conventional mobile communication apparatus having different communication interfaces. A window control technique is known as a technique of smoothly performing communication upon switching a communication interface in this mobile communication apparatus. With this window control technique, the initial TCP window size for each communication interface is set in advance. Then, upon switching from a low speed communication interface to a high speed communication interface, a mobile communication apparatus transmits a TCP-ACK packet set in the window size for the switch destination communication interface (hereinafter "ACK packet") before the communication interface switches.

With this technique, a mobile communication apparatus is configured to start handover processing. Then, with this technique, the link is switched according to the received signal strength from a base station, the IP layer is switched by mobile IP protocol processing, and the TCP window is set.

Accordingly, data is transferred after the IP layer has been switched, and therefore, to transmit the advertised window size to the communicating party after handover starts and before handover ends, it is necessary to access the communication interface after the switch meanwhile perform soft handover to maintain the connection with the communication interface before the switch (e.g. Patent Document 1).

Patent Document 1: Japanese Patent Application Laid-Open No. 2004-153321

Non-Patent Document 1: 3GPP TS23.401 V1.2.1 [online] searched on Jan. 23, 2008, the Internet <URL:http://www.3gpp.org/ftp/Specs/html-info/23401.htm>

Non-Patent Document 2: RFC 2581 TCP [online] searched on Jan. 23, 2008, the Internet <URL:http://www.ietf.org/rfc/rfc2581.txt?number=2581>

DISCLOSURE OF INVENTION

Problems to be Solved by the Invention

However, with inter-RAT handover processing in 3GPP systems such as GPS, GPRS, UMTS and LTE, the mobile communication network side decides to execute handover and secures resources for data transfer processing between mobile networks before transmitting a handover command to a mobile communication apparatus. In this way, conventionally, the mobile communication network side decides to execute handover, and therefore, there has been a problem that whether or not to execute handover cannot be decided based only on the received signal strength from a base station.

Further, in handover processing on the mobile communication apparatus side, hard handover processing is executed, whereby the connection of the communication interface before the switch is disconnected and connection of the communication interface after the switch is connected. Accordingly, there has been a problem that a new advertised window size cannot be notified to the communicating party during handover processing and the amount of data transfer during handover processing cannot be reduced.

It is therefore an object of the present invention to provide a mobile communication apparatus and mobile communication method to reduce the amount of data transfer during vertical handover processing in hard handover processing on a mobile network.

Means for Solving the Problem

The mobile communication apparatus of the present invention provides a mobile communication apparatus that has a plurality of types of radio communication interfaces and receives, from a mobile communication network, a vertical handover execution request that requests to switch a radio communication interface in use to another radio communication interface, to execute vertical handover and adopts a configuration including: a measurement processing section that measures connection quality of each of the plurality of types of radio communication interfaces; a handover execution prediction section that predicts whether or not to execute the vertical handover, based on the connection quality; and a transmission control protocol control section that sets a window size in use to a smaller window size than the window size in use when the handover execution prediction section predicts that the vertical handover is executed.

The mobile communication method of the present invention provides a mobile communication method of a mobile communication apparatus that has a plurality of types of radio communication interfaces and receives, from a mobile communication network, a vertical handover execution request that requests to switch a radio communication interface in use to another radio communication interface, to execute vertical handover and includes: measuring connection quality of each of the plurality of types of radio communication interfaces; predicting whether or not to execute the vertical handover, based on the connection quality; and a transmission control protocol control step of setting a window size in use to a smaller window size than the window size in use when the predicting step predicts that the vertical handover is executed.

Advantageous Effects Of Invention

According to the present invention, it is possible to reduce the amount of data transfer during vertical handover processing in hard handover processing on a mobile network.

BRIEF DESCRIPTION OF DRAWINGS

FIG. 2 shows a measurement result table in a measurement processing section according to the present embodiment;

FIG. 3 shows an example of handover execution condition tables in a handover condition storing section according to the present embodiment;

FIG. 4 shows an example of handover inexecution condition tables in the handover condition storing section according to the present embodiment;

FIG. 5 shows an example of a window size table in a congestion window control section according to the present embodiment;

FIG. 6 shows an example of a window size table in an advertised window control section according to the present embodiment;

FIG. 7 shows an example of a window control timer table in a window control timer management section;

BEST MODE FOR CARRYING OUT THE INVENTION

Now, an embodiment of the present invention will be described in detail with reference to the accompanying drawings.

(Embodiment 1)

Now, an embodiment of the present invention will be described with reference to the accompanying drawings.

FIGS. 1 to 9 show an example of the communication apparatus and the mobile communication method according to an embodiment of the present invention.

Figure 1:
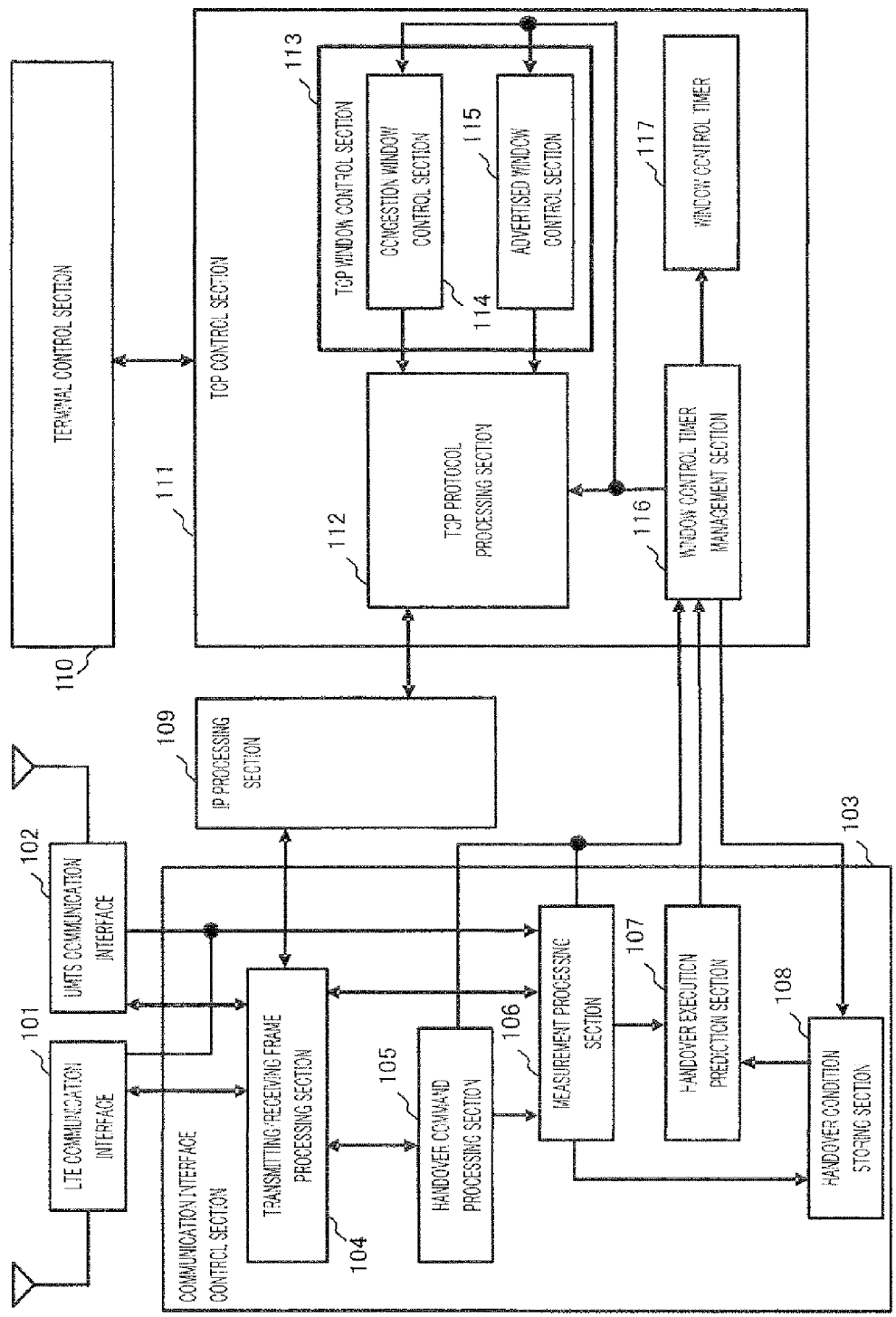
FIG. 1 is a block diagram showing a configuration of a mobile communication apparatus according to an embodiment of the present invention.

FIG. 1 is a block diagram showing a configuration of the mobile communication apparatus according to the present embodiment. In FIG. 1, a mobile communication apparatus has LTE communication interface 101, UMTS communication interface 102, communication interface control section 103, IP processing section 109, TCP control section 111 and terminal control section 110.

Although not shown, the mobile communication apparatus also has functions of a key, a display, a codec, a microphone, a speaker, a camera, a vibrator, a memory for storing and executing programs and so on, which are user interfaces to allow the user of the mobile communication apparatus to execute and select the operation of the mobile communication apparatus.

LTE communication interface 101 transmits and receives data using a 3GPP-LTE communication scheme. Further, UMTS communication interface 102 transmits and receives data using a W-CDMA (Wideband Code Division Multiple Access) communication scheme. Vertical handover is performed by switching between LTE communication interface 101 and UMTS communication interface 102.

Communication interface control section 103 has transmitting/receiving frame processing section 104, handover command processing section 105, measurement processing section 106, handover execution prediction section 107 and handover condition storing section 108.

Communication interface control section 103 manages the communication interface in use, and performs switching processing (handover processing) between LTE communication interface 101 and UMTS communication interface 102 and radio processing including media access control processing (MAC: Media Access Control), radio link control processing (RLC: Radio Link Control) and radio resource control processing (RRC: Radio Resource Control).

Transmitting/receiving frame processing section 104 analyzes a frame of the signal received in LTE communication interface 101 and UMTS communication interface 102. When a received signal includes higher layer data, transmitting/receiving frame processing section 104 separates the frame header and the trailer, and outputs the packet part to IP processing section 109. Further, transmitting/receiving frame processing section 104 adds a frame header and a trailer to a packet received from IP processing section 109 (i.e. create a frame), and passes the frame to the communication interface in use.

When a received signal is a handover command (handover execution request), transmitting/receiving frame processing section 104 passes the handover command to handover command processing section 105. Further, transmitting/receiving frame processing section 104 receives a response to the received handover command from handover command processing section 105, creates a frame, and passes the created frame to the communication interface in use. Further, transmitting/receiving frame processing section 104 passes a measurement report message generated in measurement processing section 106 to the communication interface in use.

Handover command processing section 105 receives from transmitting/receiving frame processing section 104 a handover command received via the communication interface in use, and commands measurement processing section 106 to pass the measurement result immediately before receiving the handover command, to handover condition storing section 108. Further, handover command processing section 105 requests window control timer management section 116 to stop window control timer 117 upon receiving a handover command, executes handover based on the handover command to switch the communication interface, and so on.

Measurement processing section 106 measures the connection quality of each communication interface at the time measurement is performed. Measurement processing section 106 stores a measurement result in a measurement result table provided in a storing field of measurement processing section 106. Measurement processing section 106 generates a measurement report message storing a measurement result and passes the measurement report message to transmitting/receiving frame processing section 104. Further, measurement processing section 106 passes measurement start time information to window control timer management section 116, passes measurement result information to handover condition storing section 108 upon receiving a handover command in the mobile communication apparatus.

FIG. 2 shows an example of a measurement result table stored in measurement processing section 106. The measurement result table shows that the received signal strength in LTE communication interface 101 at measurement time T1 is −11 dBm and the received signal strength in UMTS communication interface 102 at measurement time T2 is 2 dBm. Other than these, the measurement result table may include position information upon measurement.

Based on a measurement result stored in measurement processing section 106, handover execution prediction section 107 predicts execution of inter-RAT handover. Further, handover execution prediction section 107 commands window control timer management section 116 to activate window control timer 117 when predicting the execution of inter-RAT handover.

Handover condition storing section 108 having a handover execution condition table and a handover inexecution condition table, stores information applicable to each table.

The handover execution condition table is a table for storing a measurement result managed in measurement processing section 106 when handover is executed, together with the time and position information upon the measurement. Meanwhile, the handover inexecution condition table is a table for storing a measurement result managed in measurement processing section 106 when window control timer 117 has expired, together with the time and position information upon the measurement.

FIG. 3 shows an example of the handover execution condition tables. In this example, one handover execution condition table shows a measurement result when the communication interface after the switch is UMTS communication interface 102, and shows entries of the measurement time=T1, the position coordinates=P1, the received signal strength in UMTS communication interface 102=2 dBm and received signal strength in LTE communication interface 101=−11 dBm. Another handover execution condition table shows a measurement result when the communication interface after the switch is LTE communication interface 101, and shows entries of the measurement time=T3, the position coordinates=P3, the received signal strength in UMTS communication interface 102=−20 dBm and received signal strength in LTE communication interface 101=5 dBm. These entries are added and stored each time inter-RAT handover is executed.

FIG. 4 shows an example of the handover inexecution condition tables. In this example, one handover execution condition table shows a measurement result when the communication interface in use is LTE communication interface 101, and shows entries of the measurement time=T2, the position coordinates=P2, the received signal strength in UMTS communication interface 102=7 dBm and received signal strength in LTE communication interface 101=1 dBm. Another handover execution condition table shows a measurement result when the communication interface in use is UMTS communication interface 102, and shows entries of the measurement time=T4, the position coordinates=P4, the received signal strength in UMTS communication interface 102=−5 dBm and received signal strength in LTE communication interface 101=3 dBm. These entries are added and stored each time the window control timer expires. Further, these entries may be processed and stored as statistical information.

IP processing section 109 performs overall processing for the IP protocol, including receiving processing of an IP packet received from communication interface control section 103, and passing the IP packet to TCP control section 111 as required, receiving a TCP segment from TCP control section 111 and performing transmitting processing of the IP packet, and passing the IP packet after transmitting processing to communication interface control section 103.

Terminal control section 110 manages systems in the mobile communication apparatus, performs application processing and so on.

TCP control section 111 has TCP protocol processing section 112, TCP window control section 113, window control timer management section 116 and window control timer 117.

Then, TCP control section 111 performs overall processing for the TCP protocol, changes the values of the congestion window size and advertised window size by a command of window control timer management section 116 upon inter-RAT handover, and so on.

TCP protocol processing section 112 performs processing for a TCP data segment received from IP processing section 109 to pass the TCP data segment to higher applications and performs TCP segmentation on data received from higher applications to pass the data to IP processing section 109. Further, TCP protocol processing section 112 performs overall processing for the TCP protocol including TCP-ACK processing for delivery confirmation on a received TCP segment and session management such as establishing and receiving a TCP session.

TCP protocol processing section 112 sets the congestion window size, which shows the amount of continuous transmission of various types of TCP segments, to whichever is smaller between the value managed in congestion window control section 114 and the value of the advertised window size, which shows the amount of continuous reception stored in the TCP segment, transmitted from the communicating party. Based on the value managed in advertised window control section 115, TCP protocol processing section 112 then sets the congestion window size notifying to the communicating party the amount that can be continuously received in the mobile communication apparatus.

Further, when the advertised window in a period during which inter-RAT handover execution is predicted, is set to zero, TCP protocol processing section 112 generates a TCP- ACK in the reset advertised window size according to a TCP-ACK transmission request from window control timer management section 116 after handover is executed, or after count time in window control timer 117 has expired, and passes the generated TCP-ACK to IP processing section 109.

TCP window control section 113 has congestion window control section 114 and advertised window control section 115, and manages a TCP window.

Congestion window control section 114 has a window size table to manage the congestion window size in order to perform congestion control as processing on the transmitting side. Then, based on the information of this table, TCP protocol processing section 112 sets the amount of TCP data segments that can be transmitted continuously.

The window size table manages the initial value, the setting value in a predicted handover execution period, which shows the value set in the period inter-RAT handover is predicted to be executed, and the setting value before inter-RAT handover is executed, which shows the value of the congestion window size used until just before whether inter-RAT handover execution is predicted is decided. When inter-RAT handover is predicted to be executed, TCP window control section 113 sets the setting value in the predicted handover execution period at "0," sets a smaller window size than the window size normally used or sets a smaller window size than the window size in use.

FIG. 5 shows an example of a window size table managed in congestion window control section 114. With this example, the window size table shows that the initial value of the congestion window size upon using LTE communication interface 101 is 128 KB, the setting value in the predicted handover execution period is 16 KB and the setting value before executing handover is 96 KB. With this example, the window size table shows the initial value of the congestion window size upon using UMTS communication interface 102 is 32 KB, the setting value in the predicted handover execution period is 16 KB and the setting value before executing handover is 32 KB.

Advertised window control section 115 has a window size table to manage advertised window sizes stored in TCP segments in order to notify to the communicating party how much the mobile communication apparatus can presently perform receiving processing. Based on the information of this table, advertised window control section 115 stores the advertised window size in a TCP segment and passes the TCP segment to IP processing section 109. The window size table manages the initial value, the setting value in a predicted handover execution period, which shows the value set in the period inter-RAT handover is predicted to be executed, and the setting value before inter-RAT handover is executed, which shows the value of the advertised window size used until just before whether inter-RAT handover execution is predicted is decided. TCP protocol control section 112 sets the setting value in a predicted handover execution period at "0," sets a smaller window size than the window size normally used or sets a smaller window size than the window size in use.

FIG. 6 shows an example of a window size table managed in advertised window control section 115. With this example, the window size table shows that the initial value of the congestion window size upon using LTE communication interface 101 is 128 KB, the setting value in a predicted handover execution period is 16 KB and the setting value before executing handover is 96 KB. With this example, the window size table shows that the initial value of the congestion window size upon using UMTS communication interface 102 is 32 KB, the setting value in the predicted handover execution period is 16 KB and the setting value before executing handover is 32 KB.

When vertical handover is predicted to be executed, window control timer management section 116 determines the predicted handover execution period during which data is transmitted and received in the small window size. Further, window control timer management section 116 starts counting time in window control timer 117 according to a request from handover execution prediction section 107, and stops window control timer 117 by a handover command reception notification from handover command processing section 105.

Further, while window control timer 117 is counting time, window control timer management section 116 respectively notifies congestion window control section 114 and advertised window control section 115 of the congestion window size and the advertised window size such that TCP protocol processing section 112 uses values set based on setting values in a predicted handover execution period.

Further, window control timer management section 116 respectively notifies congestion window control section 114 and advertised window control section 115 of the congestion window size and the advertised window size such that TCP protocol processing section 112 uses values calculated based on setting values before executing handover managed in congestion window control section 114 and advertised window control section 115.

Further, based on the values obtained in the past period from the time when measurement is executed till the time when a handover command is received, window control timer management section 116 sets the expiration time of window control timer 117 and decides whether window control timer 117 has expired. In other words, window control timer management section 116 decides whether or not a predicted handover execution period has elapsed.

When count time in window control timer 117 has expired, window control timer management section 116 respectively notifies congestion window control section 114 and advertised window control section 115 of the congestion window size and the advertised window size such that TCP protocol processing section 112 uses values set based on the setting values before executing handover for the congestion window size and the advertised window size. By resetting the window size values to window size values before change by handover prediction, it is possible to stop reducing the amount of data transfer in a case where a vertical handover execution request is not received after vertical handover is predicted, so that it is possible to prevent communication from continuously executing in low throughput.

FIG. 7 shows an example of a window control timer table managed in window control timer management section 116. The window control timer table has entries of the initial value, the latest value and the setting value for each switching direction, that is, each of inter-RAT handover from LTE communication interface 101 to UMTS communication interface 102 and inter-RAT handover from UMTS communication interface 102 to LTE communication interface 101. Here, the initial value shows the default value for deciding whether the window control timer has expired with regards to the corresponding inter-RAT handover. Further, the latest value shows the time period from the time when measurement is executed till the time when a handover command is received, in inter-RAT handover executed previously, in each switching direction. Further, the setting value is determined based on the value tallied by managing a history of the latest values in inter-RAT handover per switching direction executed in the past, as a latest value entry group.

In FIG. 7, when inter-RAT handover from LTE communication interface 101 to UMTS communication interface 102 is predicted, the values in the window control timer table are shown as follows. The expiration value of window control timer 117 is 2 see at the initial value, 50 ms at the latest value, and 1 sec at the setting value. Further, when inter-RAT handover from UMTS communication interface 102 to LTE communication interface 101 is predicted, the values in the window control timer table are shown as follows. The expiration value of window control timer 117 is 5 see at the initial value, 70 ms at the latest value, and 1 sec at the setting value. The expiration value of window control timer 117 corresponding to the predicted handover execution period is set to 1 see upon the switch to each direction.

Here, "the setting value determined based on the value tallied by managing a history of the latest values in inter-RAT handover per switching direction executed in the past, as a latest value entry group" will be explained. The latest value entry is updated upon executing inter-RAT handover, and the values before the update are stored as histories, which are the latest value entry groups. The mobile communication apparatus according to the present invention defines a method of determining a setting value in window control timer management section 116, and determines the setting value, for example, to be an average value, expected value or latest value. With regards to the setting value, the value in the latest value entry group is tallied based on the defined method.

Further, another method of defining a setting value includes listing the latest values upon receiving a handover command together with position information at the time, and setting the setting value at the value of the entry designating the closest position to the current position. Alternately, other methods include setting the setting value at the maximum value in the latest value entry group upon executing inter-RAT handover within a 1-km radius from the current position. When the LTE communication interface is switched to the UMTS communication interface in this example, assume that the setting value is defined such that whichever is greater between twice the expected value and the maximum value of the expected value acquired from the latest value entry group, is the expiration value of window control timer 117. If the expected value and the maximum value obtained by tallying latest value entry group data are 500 ms and 800 ms, 1 sec of the greater value between twice 500 ins and 800 ms is set to the setting value.

Next, the operation of the radio communication apparatus configured as above will be explained.

Figure 8:
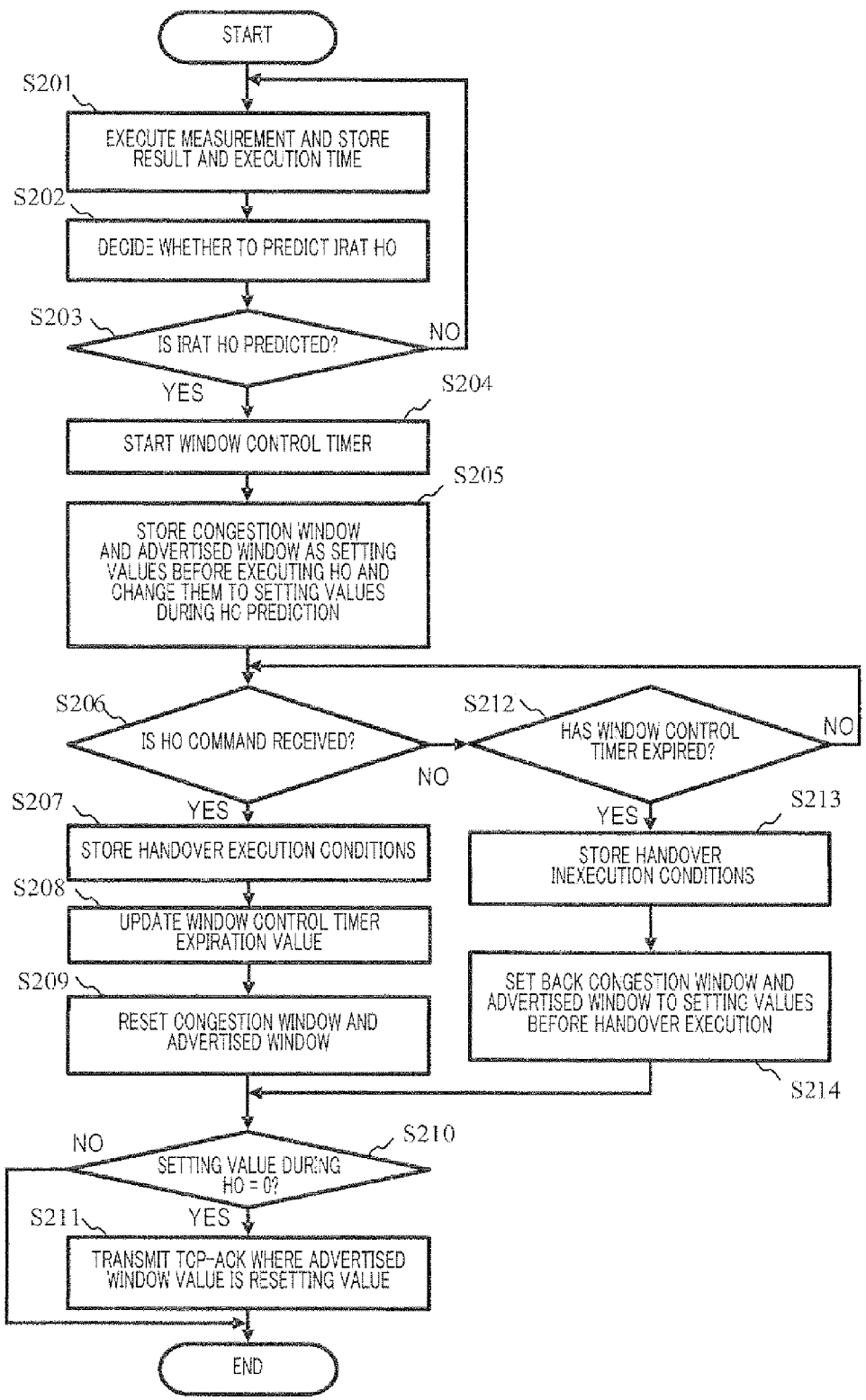
FIG. 8 is a flowchart of window control according to the present embodiment.

FIG. 8 is a flowchart where a mobile communication apparatus executes inter-RAT handover.

In step S 201, a mobile communication apparatus is configured to measure the connection quality of specific communication interfaces at regular intervals from a mobile communication network and transmit the measurement result to the mobile communication network predetermined times after measurement. Then, the mobile communication apparatus measures the received signal strength and so on in each communication interface at regular intervals, transmits the measurement result as a measurement report message to the mobile communication network and holds the measurement result in a measurement result table in measurement processing section 106. Further, the mobile communication apparatus stores a measurement start time in the storage area in window control timer management section 116.

Figure 9:
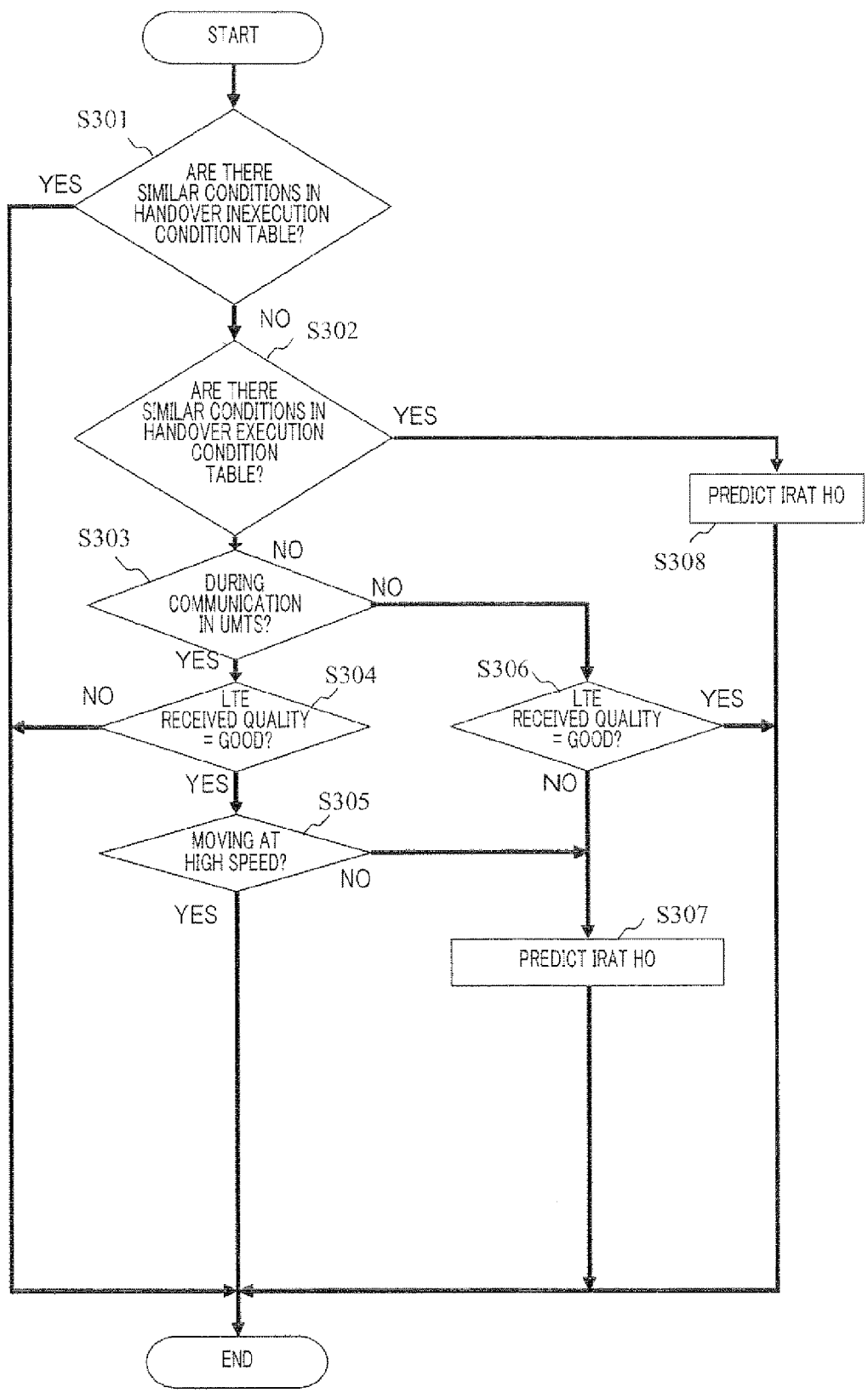
FIG. 9 is a flowchart of inter-RAT handover prediction decision processing according to the present embodiment.

In step S 202, the mobile communication apparatus holds the measurement result in the measurement result table in measurement processing section 106, and decides whether to predict inter-RAT handover shown in FIG. 9 based on the measurement result. FIG. 9 will be described later.

In step S 203, whether or not to fulfill the inter-RAT handover are fulfilled is decided.

In step S 204, if decision is made that the inter-RAT handover execution conditions are fulfilled based on the measurement result obtained in step S 202 (S 203: "YES"), handover execution prediction section 107 commands window control timer management section 116 to activate window control timer 117, which defines the period to control the TCP window. Then, window control timer management section 116 sets the timer expiration value to the setting value corresponding to the communication interface in use stored in window control timer management section 116. Window control timer 117 then starts counting time.

In step S 203, if the inter-RAT handover execution conditions are not fulfilled (S 203: "NO") is decided, the processing of step S 201 is executed at the next measurement time.

In step S 204, window control timer 117 is activated and starts counting time.

In step S 205, window control timer management section 116 stores the window sizes in use managed in congestion window control section 114 and advertised window control section 115 in separate window size tables in congestion window control section 114 and advertised window control section 115. Further, window control timer management section 116 commands TCP protocol processing section 112 to set the window sizes in congestion window control section 114 and advertised window control section 115 to the setting values in the predicted handover execution periods stored in the window size tables.

By this means, the congestion window upon transmitting TCP-DATA and the advertised window upon transmitting TCP-ACK are transmitted using the setting values in the predicted handover execution periods.

In step S 206, upon receiving the received frame transmitted by the mobile communication network via either LTE communication interface 101 or UMTS communication interface 102 while window control timer 117 is counting time, the mobile communication apparatus analyzes the received frame in transmitting/receiving frame processing section 104, to decide whether or not the received signal is a handover command.

In step S 207, if a handover command is received (S 206: "YES"), the mobile communication apparatus passes the handover command to handover command processing section 105, and passes the measurement result stored in measurement processing section 106 to handover condition storing section 108. Handover condition storing section 108 stores the measurement result together with the measurement time information in the handover execution condition table in handover condition storing section 108. In this case, the position information of the mobile communication apparatus, the base station load information acquired from the mobile communication network and so on may be stored in the handover execution condition table.

In step S 208, handover command processing section 105 reports, to window control timer management section 116, the reception of the handover command, information showing which interface is switched to which interface and the handover command reception time. Then, upon receiving this report, window control timer management section 116 stops counting time in window control timer 117 and calculate the period from the time when the measurement is started till the time when the handover command is received, based on the reported information, and stores entries of the latest value in the window control timer table. Further, window control timer management section 116 holds the latest value entries in the past in a list structure in each time the interface is switched as described above, and determines and updates the expiration value of window control timer 117 based on the latest value entry group of the applicable interface. The expiration value is determined, for example, using a method of determining from the latest value, the expiration value or the maximum value in the latest value entry group. Further, other methods include listing the latest values upon receiving a handover command together with position information at that time, and setting the setting value at the value of the entry designating the closest position to the current position.

In step S 209, window control timer management section 116 instructs congestion window control section 114 and advertised window control section 115 to reset the window sizes, and each window size is reset to a value corresponding to either LTE communication interface 101 or UMTS communication interface 102 that uses the window sizes. Here, the resetting value may be set to the initial value corresponding to the communication interface after the switch in the window size table, and set to a value obtained from the window size value used before executing handover×communication capacity in the interface after the switch (Mbps)/communication capacity in the interface before the switch (Mbps), and so on.

In step S 210, window control timer management section 116 decides whether or not the advertised window size setting value during handover is zero.

In step S 211, if the advertised window size setting value during handover is zero (S 210: "YES"), TCP communication is temporarily stopped on the TCP server side due to TCP protocol rules, and therefore the mobile communication apparatus sets the advertised window size value to the reset value and transmits a TCP-ACK.

In this case, the reset value corresponds to the value reset in step S 209 in a case where a handover command is received, and corresponds to the value reset in step S 214 (described later) in a case where the window control timer has expired.

On the other hand, in step S 213, if step S 206 decides that a handover command is not received and if step S 212 decides that window control timer 117 has expired, that is, if the window control timer has expired before a handover command is received (S 212: "YES"), window control timer management section 116 notifies handover condition storing section 108 to acquire the measurement result from measurement processing section 106. Handover condition storing section 108 stores the measurement result in the handover inexecution condition table as a condition in which handover is not actually executed despite handover prediction is executed. In this case, the position information of the mobile communication apparatus, the base station load information acquired from the mobile communication network and so on may be stored in handover inexecution condition table. If it is decided that window control timer 117 has not yet expired (S 212: "NO"), the step returns to step S 206.

Next, in step S 214, window control timer management section 116 notifies congestion window control section 114 and advertised window control section 115 that the window control timer has expired. Congestion window control section 114 and advertised window control section 115 then reset each window size to the window size value before change by handover prediction, and the step moves to S 210.

By resetting the window size values to window size values before change by handover prediction, it is possible to stop reducing the amount of data transfer in a case where a vertical handover execution request is not received after vertical handover is predicted, so that it is possible to prevent communication from continuously executing in low throughput.

FIG. 9 shows a flowchart of the inter-RAT handover prediction decision processing (S 202) shown in FIG. 8.

In step S 301, in inter-RAT handover prediction processing, handover execution prediction section 107 decides whether or not there is information similar to the present conditions, with reference to the handover inexecution condition table stored in handover condition storing section 108. Here, whether to decide similar conditions includes in cases as an example where the entries of the use interfaces for use are the same and the difference from the position information entry is a 1-km radius or less, where the entries of the interfaces for use are the same and the difference from the received signal strength of an interface shown in the available interface is 1 dBm or less.

If similar conditions are present in the handover inexecution condition table (S 301: "YES"), it is predicted that inter-RAT handover does not occur, and therefore the handover prediction decision processing in step S 202 is finished.

In step S 302, if similar conditions are not present in the handover inexecution condition table (S 301: "NO"), handover execution prediction section 107 decides whether or not there is information similar to the present conditions, with reference to the handover execution condition table stored in handover condition storing section 108. Here, whether to decide similar conditions includes cases as an example where the entries of the interfaces for use are the same and the difference from the position information entry is a–1 km radius or less, where the entries of the interfaces for use are the same and the difference from the received signal strength of an interface shown in the available interface is 1 dBm or less.

In step S 308, if similar conditions are present in the handover execution condition table (S 302: "YES"), it is predicted inter-RAT handover occurs, and therefore the handover prediction decision processing (S 202) is finished.

In step S 303, if similar conditions are not present in the handover execution condition table (S 302: "NO"), it is decided whether the communication interface in use is UMTS communication interface 102 or LTE communication interface 101.

In step S 304, if decision is made that UMTS interface 102 is in use (S 303: "YES"), handover execution prediction section 107 decides whether or not LTE received quality using LTE communication interface is good, with reference to the measurement result stored in measurement processing section 106.

If it is decided that the LTE received quality is not good (S 304: "NO"), handover is not executed for LTE communication interface 101, and therefore the inter-RAT handover prediction processing is finished. Here, with regards to whether or not LTE received quality is good, LTE received quality can be decided to be good in a case, for example, where the received signal strength in LTE communication interface 101 exceeds a given threshold value in the result measured immediately before, or where LTE communication interface 101 has a greater received signal strength than that of UMTS communication interface 102.

In step S 305, if it is decided that the LTE received quality is good (S 304: "YES"), the mobile communication apparatus decides whether or not the mobile communication apparatus is moving at high speed. Here, whether or not the mobile communication apparatus is moving at high speed is determined, for example, using the method of predicting mobility area update intervals, which are calculated from position information and time ranges of the position information measurement measured by GPS and so on, and using the method of making the decision from the size of differences from the previous measurement value at each time measurement is performed.

If it is decided that the mobile communication apparatus is moving at high speed (S 305: "YES"), handover for LTE communication interface 101 where service areas are developed in individual spots is not executed, and therefore the inter-RAT handover prediction processing is finished.

In step S 307, if it is decided that the mobile communication apparatus is not moving at high speed (S 305: "NO"), handover execution prediction section 107 predicts that inter-RAT handover occurs, and finishes the inter-RAT handover prediction processing.

In step S 306, if LTE communication interface 101 is in use (S 303: "NO"), handover execution prediction section 107 decides whether or not LTE received quality using LTE communication interface 101 is good.

If it is decided that the LTE received quality is good (S 306: "YES"), handover for UMTS communication is not executed, and therefore handover execution prediction section 107 finishes the inter-RAT handover prediction processing.

In step S 307, if it is decided that LTE received quality is not good (S 306: "NO"), handover execution prediction section 107 decides that handover for UMTS communication interface 102 occurs, and therefore finishes the inter-RAT handover prediction processing.

Although a case has been explained with the present embodiment where handover prediction is executed in the inter-RAT handover prediction processing assuming that service areas of LTE communication are developed on a spot basis and service areas of UMTS communication are developed on an area basis, the decision as to whether or not a mobile communication apparatus is moving at a high speed (S 305) may not be needed when service areas of LTE communication are developed in planes.

Although a case has been explained with the present embodiment where inter-RAT handover is predicted according to received signal strength in the inter-RAT handover prediction processing, inter-RAT handover may be predicted based on information obtained by measuring in a mobile communication apparatus the number of mobile communication apparatuses connected with the same base station via radio and the amount of communication conducted in mobile communication apparatuses connected with the same base station via radio. Further, information including the number of mobile communication apparatuses connected with the same base station via radio and the amount of communication conducted in mobile communication apparatuses connected with the same base station via radio may be notified from a mobile communication network to the mobile communication apparatus, and the mobile communication apparatus may predict inter-RAT handover based on these information. In this ease, if the total amount of data transmission by another mobile communication apparatus significantly increases in the communication interface in use, it is possible to decide that inter-RAT handover occurs.

Further, although the inter-RAT handover is predicted according to received signal strength in the inter-RAT handover prediction processing of the present embodiment, prediction may be performed only using position information. That is, in neighboring locations (for example, within a 1-km radius) from the place where inter-RAT handover occurs, it is equally possible to decide that inter-RAT handover occurs.

Although a case has been explained as an example where the communication interfaces are the LTE communication interface and the UMT communication interface, communication interfaces such as a GSM scheme, GPRS scheme, IEEE 802.11 scheme (a, b, g and n scheme) and IEEE 802.15 scheme may be applicable.

In this way, according to the present embodiment, when inter-RAT handover is executed, the TCP window size can be smaller in the inter-RAT handover preparatory stages in a mobile communication network, so that it is possible to reduce the amount of data communication during handover and the load of data transfer processing between mobile communication networks.

Further, upon transfer from a high speed communication network to a low speed communication network, it is equally possible to reduce, between mobile communication networks, the transfer of data that has been transferred with a large amount in a high speed communication network, and prevent data loss due to data delay in a base station in a low-speed communication network. By this means, it is possible to prevent network congestion even when the difference between radio link performances is significant before and after handover.

Communication interface control section 103 (transmitting/receiving frame processing section 104, handover command processing section 105, measurement processing section 106, handover execution prediction section 107 and handover condition storing section 108) and TCP control section 111 (TCP protocol processing section 112, congestion window control section 114, advertised window control section 115, window control timer management section 116 and window control timer 117) may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-025623, filed on Feb. 5, 2008, including the specification, drawings and abstract, is incorporated herein by reference in its entirety.

Industrial Applicability

The mobile communication apparatus and the mobile communication method of present invention are suitable for use in an apparatus and a method that allow the amount of data transfer to be reduced during vertical handover in hard handover processing on a mobile network.

That is, the mobile communication apparatus and the mobile communication method of present invention can reduce network processing from vertical handover preparatory stages between communication networks having different characteristics, and reduce data loss during handover, and are suitable for use in, for example, mobile phones adopting both LTE communication and UMTS communication including W-CDMA. Further, the mobile communication apparatus and the mobile communication method of present invention are applicable for use in, for example, an information communication terminal having a plurality of types of communication interfaces, a sensor network terminal and a vehicle communication apparatus.

The invention claimed is:

1. A mobile communication apparatus that has a plurality of types of radio communication interfaces and receives, from a mobile communication network, a vertical handover execution request that requests to switch a radio communication interface in use to another radio communication interface, to execute vertical handover, the mobile communication apparatus comprising:
- a measurement processing section that measures connection quality of each of the plurality of types of radio communication interfaces;
- a handover execution prediction section that predicts whether or not to execute the vertical handover, based on the connection quality;
- a transmission control protocol control section that sets a window size in use to a smaller window size than the window size in use when the handover execution prediction section predicts that the vertical handover is executed;
- a window control timer that counts time; and
- a window control timer management section that, when the handover execution prediction section predicts that the vertical handover is executed, determines a predicted handover execution period during which data is transmitted and received in the smaller window size and manages the window control timer to count the predicted handover execution period,
- wherein, when the window control timer is stopped according to reception of the vertical handover execution request or the predicted handover execution period has expired, the transmission control protocol control section performs transmission control protocol window setting for optimizing the window size.

2. The mobile communication apparatus according to claim 1, further comprising a handover condition storing section that stores connection quality and position information of each of types of radio communication interfaces when the vertical handover is executed, and stores connection quality and position information of each of types of radio communication interfaces when the vertical handover is not executed during the predicted handover execution period,
- wherein the handover execution prediction section refers to connection quality and position information of each of types of radio communication interfaces and the connection quality and the position information of each of types of radio communication interfaces stored in the handover condition storing section, to predict vertical handover execution.

3. The mobile communication apparatus according to claim 1, wherein the predicted handover execution period determined by the window control timer management section is determined based on time data tallied in a past period from a time when connection quality of each of types of radio communication interfaces is measured until a time when a vertical handover execution request is received.

4. The mobile communication apparatus according to claim 1, wherein, when the predicted handover execution period has expired without receiving the vertical handover execution request from the mobile communication network during the predicted handover execution period, the transmission control protocol control section sets the smaller window size to a window size before the predicted handover execution period.

5. The mobile communication apparatus according to claim 1, wherein, when the vertical handover execution request is received from the mobile communication network after the predicted handover execution period, the transmission control protocol control section sets a window size based on a window size before the predicted handover execution period and capacity of a radio communication interface used after executing the vertical handover.

6. A mobile communication method of a mobile communication apparatus that has a plurality of types of radio communication interfaces and receives, from a mobile communication network, a vertical handover execution request that requests to switch a radio communication interface in use to another radio communication interface, to execute vertical handover, the method comprising:
- measuring connection quality of each of the plurality of types of radio communication interfaces;
- predicting whether or not to execute the vertical handover, based on the connection quality;
- setting a window size in use to a smaller window size than the window size in use when it is predicted that the vertical handover is executed
- counting time in a window control timer; and
- determining, when the predicting includes predicting that the vertical handover is executed, a predicted handover execution period during which data is transmitted and received in the smaller window size and managing the window control timer to count the predicted handover execution period,
- wherein, when the window control timer is stopped according to reception of the vertical handover execution request or the predicted handover execution period has expired, setting the window size further performs transmission control protocol window setting for optimizing the window size.

7. The mobile communication method according to claim 6, further comprising:
- storing connection quality and position information of each of types of radio communication interfaces when the vertical handover is executed, and storing connection quality and position information of each of types of radio communication interfaces when the vertical handover is not executed during the predicted handover execution period,
- wherein predicting whether or not to execute the vertical handover refers to connection quality and position information of each of types of radio communication interfaces and the connection quality and the position information of each of types of radio communication interfaces stored in the handover condition storing section, to predict vertical handover execution.

8. The mobile communication method according to claim 6, wherein the determined predicted handover execution period is determined based on time data tallied in a past from a time when connection quality of each of types of radio communication interfaces is measured until a time when a vertical handover execution request is received.

9. The mobile communication method according to claim 6, wherein, when the predicted handover execution period has expired without receiving the vertical handover execution request from the mobile communication network during the predicted handover execution period, setting the window size sets the smaller window size to a window size before the predicted handover execution period.

10. The mobile communication method according to claim 6, wherein, when the vertical handover execution request is received from the mobile communication network after the predicted handover execution period, setting the window size sets a window size based on a window size before the predicted handover execution period and capacity of a radio communication interface used after executing the vertical handover.

* * * * *